United States Patent [19]
Suga et al.

[11] Patent Number: 5,348,820
[45] Date of Patent: Sep. 20, 1994

[54] ZINC ELECTRODE FOR ALKALINE STORAGE BATTERY

[75] Inventors: Masanobu Suga, Yokohama; Seiichi Akita, Fujisawa; Nobuyuki Kuroda, Yokohama, all of Japan

[73] Assignee: Nippon Oil Company, Limited, Tokyo, Japan

[21] Appl. No.: 89,750

[22] Filed: Jul. 9, 1993

[30] Foreign Application Priority Data

Jul. 10, 1992 [JP] Japan ............................ 4-223147
Aug. 10, 1992 [JP] Japan ............................ 4-253395

[51] Int. Cl.$^5$ ............................................. H01M 4/24
[52] U.S. Cl. ...................................... 429/216; 429/229; 29/623.5
[58] Field of Search ................ 429/229, 215, 216, 137, 429/212, 209, 246, 206; 29/623.5

[56] References Cited

U.S. PATENT DOCUMENTS

| | | | |
|---|---|---|---|
| 3,901,732 | 8/1975 | Kis | 429/229 X |
| 4,001,467 | 1/1977 | Sullivan | 429/229 X |
| 4,407,913 | 10/1983 | Rampel | 429/229 |
| 4,524,509 | 6/1985 | Wegner | 429/137 X |
| 4,530,890 | 7/1985 | Rampel | 429/137 X |
| 4,576,883 | 3/1986 | Hope et al. | 429/215 X |
| 5,208,122 | 5/1993 | Hirakawa et al. | 429/215 X |

*Primary Examiner*—Anthony Skapars
*Attorney, Agent, or Firm*—Dilworth & Barrese

[57] ABSTRACT

A negative zinc electrode for an alkaline storage battery capable of suppressing the occurrence of dendrite and shape change is provided. The negative zinc electrode comprises an electrode using zinc as an active material and a polymer layer formed substantially in direct contact with the electrode, the polymer layer comprising a polymer having an oxygen permeability constant of not less than $1 \times 10^{-10}$ cm$^3$ (STP) cm$^{-1}$s$^{-1}$cmHg$^{-1}$.

8 Claims, 3 Drawing Sheets

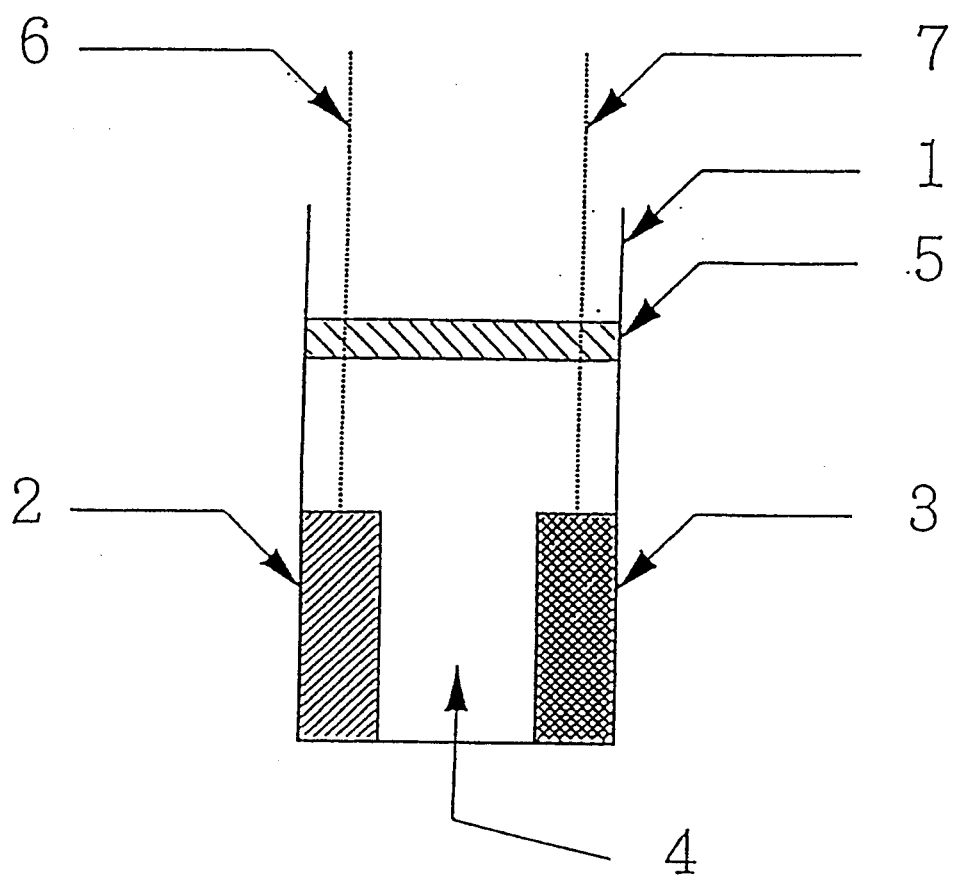
FIG_1

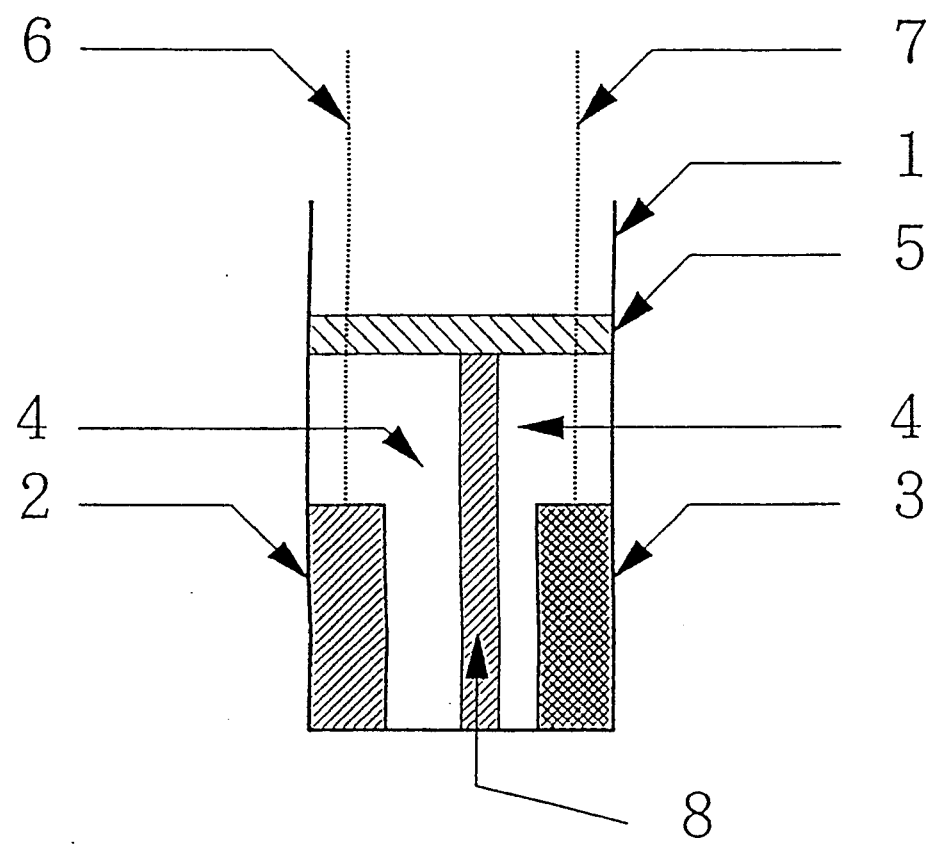
FIG_2

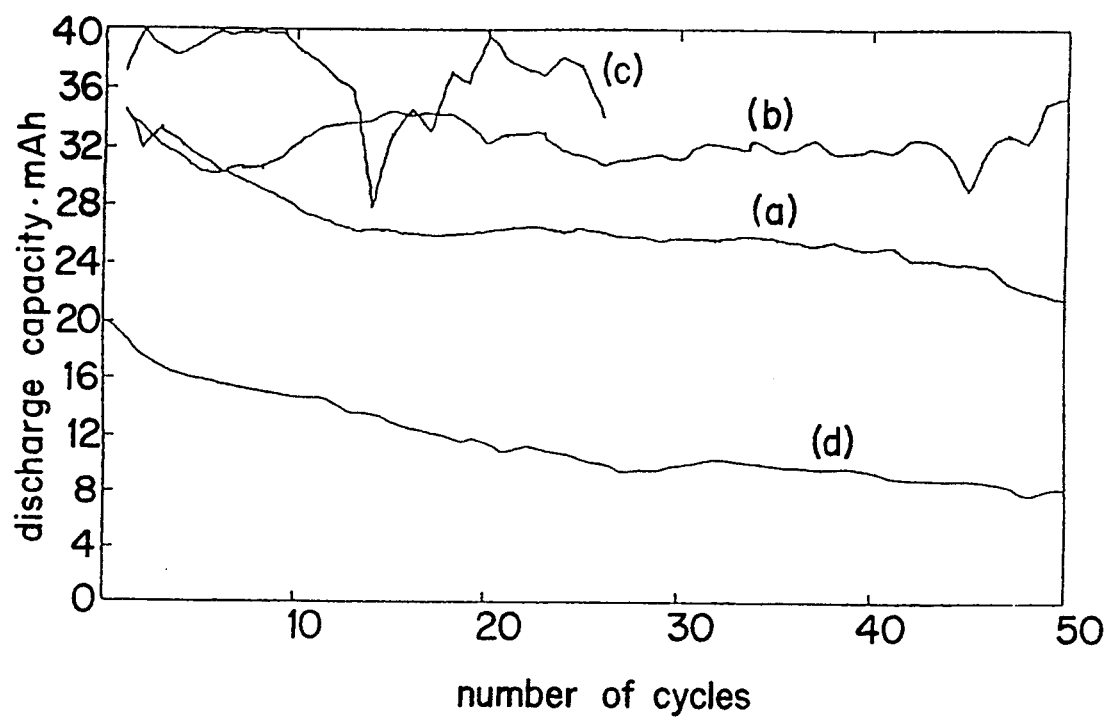
FIG._3

ZINC ELECTRODE FOR ALKALINE STORAGE BATTERY

BACKGROUND OF THE INVENTION

The present invention relates to an alkaline storage battery using zinc as a negative electrode such as, for example, nickel-zinc, silver-zinc or zinc-manganese storage battery and particularly to an improvement of the zinc electrode used as a negative electrode.

An alkaline secondary battery using zinc as a negative electrode has a high energy density and a good output characteristic and can be produced inexpensively, so is expected as a power source for portable devices and electric vehicles.

However, since the solubility of zinc as an active material of the negative electrode is high, there arise problems. For example, zincate ions which have been dissolved out during electric discharging form dendrites and cause a short circuit, or the electrode itself undergoes a change in shape, resulting in lowering of the utilization factor. Due to these problems, an alkaline secondary battery using zinc as a negative electrode and having a sufficiently long cycle life has not been obtained yet.

For solving the above problems, various improvements have been made with respect to electrolyte, separator and electrode. However, there has not been obtained yet an alkaline secondary battery using zinc as a negative electrode and having a sufficiently long cycle life.

Particularly, the separator is generally known as means for suppressing dendrite physically, and various studies have been made using polyolefin non-woven fabric and other materials. The separator is required to have ion conductivity, gas permeability and capability of preventing a short circuit caused by dendrites. To meet these requirements, improvements have been made; for example, a metal is held in the separator (Japanese Patent Laid Open Nos. JP57-197758A and JP59-63672A, a copolymer is used as the separator material (Japanese Patent Publication No. JP55-24660B and Patent Laid Open No. JP60-253152A), or the separator is treated with a surface active agent (Japanese Patent Laid Open No. JP4-141951A). However, these methods involve a complicated process and therefore a method capable of affording a satisfactory effect through a simpler process has been desired.

Moreover, zincate ions which were dissolved out into an electrolyte layer during electric discharge are segregated onto electrodes at the time of charging, resulting in a shape change of the electrodes and decrease in the charge and discharge capacity of the battery. It has been impossible to prevent such inconvenience even by improvement of the separator.

Further, applying a polyvinyl alcohol directly to electrodes to improve the cycle characteristic in a bound state to the separator has also been tried, as shown in Japanese Patent Laid Open No. 1457/1991. However, the cycle characteristic is not satisfactory in practical use because the polyvinyl alcohol used as a binder is not considered satisfactory in its ability to prevent the growth of dendrite.

It is the object of the present invention to overcome the above-mentioned problems, particularly to provide a storage battery using zinc as a negative electrode in which the cycle characteristic is improved by suppressing dendrite and shape change in an initial stage thereof.

SUMMARY OF THE INVENTION

Having made intensive studies along the above object, the present inventors found that by disposing a polymer superior in gas permeability in close proximity to zinc as an active material and allowing the active material, zinc, of an alkaline storage battery to act on an electrolyte substantially through the polymer, it was possible to suppress dendrite and shape change of the negative zinc electrode. Eventually there could be obtained an alkaline zinc storage battery superior in cycle life. In this way the present invention was accomplished.

More specifically, the present invention, in one aspect thereof, resides in a negative zinc electrode for an alkaline storage battery, having a layer of a polymer (hereinafter referred to as "polymer (I)") which is substantially in direct contact with an electrode using zinc as an active material, the polymer having an oxygen permeability constant of not less than $1 \times 10^{-10} cm^3$ (STP) $cm^{-1}s^{-1}cmHg^{-1}$, as well as an alkaline storage battery using such negative zinc electrode.

The present invention, in another aspect thereof, resides in a method for making a negative zinc electrode for an alkaline storage battery, including the steps of forming on a zinc electrode a coating containing at least a polymer precursor which is in the state of a sol and allowing gelation to take place to form a polymer layer which is substantially in direct contact with the electrode, the polymer layer having an oxygen permeability constant of not less than $1 \times 10^{-10} cm^3$ (STP) $cm^{-1}s^{-1}cmHg^{-1}$.

BRIEF DESCRIPTION OF THE DRAWINGS

FIG. 1 is a sectional view showing the construction of a battery cell used in Example 1;

FIG. 2 is a sectional view showing the construction of a battery cell used in Example 2; and FIG. 3 is a graph showing charge and discharge characteristics obtained in working examples and comparative examples.

In the drawings, the reference numeral 1 denotes a glass cell, the numeral 2 denotes a negative electrode, numeral 3 denotes a positive electrode (Ni electrode), numeral 4 an electrolyte, numeral 5 a liquid paraffin, numeral 6 a negative electrode terminal and numeral 7 a positive electrode terminal.

DETAILED DESCRIPTION OF THE INVENTION

An alkaline storage battery having a negative zinc electrode is provided with a structure of preventing the rise in internal pressure of the battery by allowing oxygen and hydrogen which are generated from the electrode surface at the time of charge and discharge, to react in the interior of the battery. Therefore, it is necessary for the polymer layer to permit permeation of oxygen or hydrogen therethrough. Generally, however, since oxygen is more difficult to pass through the polymer layer than hydrogen, an oxygen permeability constant is used to represent polymer properties in the invention.

The oxygen permeability constant (P) as referred to herein indicates a volume in $cm^3$ obtained by converting an experimental value into permeation area 1 $cm^2$, partial pressure difference 1 cmHg and thickness 1 cm and converting the amount of gas permeated for a period of one second into a volume in a standard state, in accordance with the following equation:

$$Q = (P/l)(p_1 - p_2)At$$

where,
Q: amount of oxygen permeated
P: oxygen permeability constant
p1: partial pressure of gas fed to the polymer film
p2: partial pressure of gas on the permeation side of the film
l: film thickness
A: permeation area
t: time Therefore, the unit is $cm^3$ (STP) $cm^{-1}s^{-1}cmHg^{-1}$.

The polymer (I) which constitutes the polymer layer used in the present invention contains, in a working example thereof, at least a polymer (A) which will be described later and/or a polymer (hereinafter referred to as "polymer (A')") obtained by substituting a portion of the skeleton of the polymer (A) with a group (B), and if necessary, further contains a polymer (C) which will be described later, and still further contains a later-described polymer (D) where required.

The polymer (A) used in the present invention is not specially limited if only it is a polymer having an oxygen permeability constant of not less than $1 \times 10^{-8}$ $cm^3$ (STP) $cm^{-1}s^{-1}cmHg^{-1}$. It is desirable that the oxygen permeability constant of the polymer (A) be not less than $1 \times 10^{-10}$ $cm^3$ (STP) $cm^{-1}s^{-1}cmHg^{-1}$. Examples of such polymer (A) include polydimethylsiloxanes, polyorganosiloxanes, polyvinyltriorganosiloxanes, polyalkylsulfones, poly(4-methylpentene-1), poly(2,6-dimethylphenylene oxide) and low-density polyethylenes, having a molecular weight of usually 1,000 to 2,000,000, preferably 10,000 to 1,000,000.

If the oxygen permeability constant of the polymer (A) is less than $1 \times 10^{-10} cm^3$ (STP) $cm^{-1}s^{-1}cmHg^{-1}$, the oxygen permeability constant of the polymer (I) will become insufficient, with the result that hydrogen induced by self-discharge is accumulated in the electrode interior or oxygen generated in the positive electrode during charging cannot be consumed by the so-called Neumann effect in the negative electrode. This is undesirable.

If a group ("group (B)" hereinafter) which exhibits the effect of improving the ion conductivity of the polymer (A) is introduced in part of the skeleton of the polymer (A), an internal impedance of the alkaline storage battery will be decreased to improve the charge and discharge characteristic. So this is particularly desirable. The polymer obtained by introducing the group (B) in part of the skeleton of the polymer (A) is here designated polymer (A').

The group (B) comprises one or more dissociative groups or polar groups selected from the group consisting of, for example, —COOH, —CN, —CONH$_2$ and —N$^+$R$_3$ where R is a hydrogen atom or an alkyl group having 1 to 4 carbon atoms. As the method for introducing the group (B) into the polymer (A) there is mentioned a method of grafting the group (B) to the polymer (A) or a method of copolymerizing a precursor monomer of the polymer (A) with a monomer having the group (B).

It is desirable that the group (B) be introduced usually 1 to 50 units, preferably 3 to 20 units, for 10 monomer units of the polymer (A).

If the proportion of the group (B) is less than 1 unit, there will not be attained a satisfactory effect, and if it exceeds 10 units, it is likely that the polymer (A') will no longer able to maintain a sufficient oxygen permeability constant. Thus, both such proportions are undesirable.

Further, for the purpose of decreasing the internal impedance of the storage battery, it is also preferred that a polymer ("polymer (C)" hereinafter) whose ion conductivity is relatively high in a fully swollen condition in an electrolyte (e.g. a 30 wt % aqueous solution of potassium hydroxide) be incorporated into the polymer (I) where required.

The polymer (C) is not specially limited if only its ion conductivity in a fully swollen state is usually in the range of $10^{-3}$ to $10^1$ S/cm, preferably $10^{-2}$ to $10^{-1}$ S/cm. As examples of such polymer (C) there are mentioned polyvinyl alcohol, carboxymethyl cellulose, polyacrylonitrile, polyacrylic acid, polymethacrylic acid, polyacrylate, polymethacrylate, polyvinylpyrrolidone, polyparabanic acid, polyoxazoline and polyethylene oxide.

The proportion of the polymer (C) is not specially limited and a suitable proportion thereof can be selected according to a purpose. But usually the proportion of the polymer (C) is in the range of 10 to 90 wt %, preferably 30 to 70 wt %, relative to the polymer (I). If the polymer (C) proportion is less than 10 wt %, there will not be attained a satisfactory effect and if it exceeds 90 wt %, it will become difficult to maintain the foregoing oxygen permeability constant. Thus, both such proportions are not desirable.

The polymer (I) may further contain a polymer ("polymer (D)" hereinafter) for imparting hardness of flexibility thereto if necessary. As examples of such polymer (D) there are mentioned polystyrene, polycarbonate, polyvinyl chloride and polyethylene terephthalate.

The proportion of the polymer (D) is not specially limited and a suitable proportion thereof can be selected as necessary. But usually it is in the range of 2 to 50 wt %, preferably 5 to 20 wt %, relative to the polymer (I). If the proportion of the polymer (D) is smaller than 2 wt %, it will be difficult to obtain the effect of its addition, and if it is larger than 50 wt %, it will become difficult to maintain the foregoing oxygen permeability constant and impart ion conductivity to the polymer (I). Thus, both such proportions are undesirable.

In the present invention, by coating a zinc electrode with the polymer (I) thus obtained, there can be provided a zinc electrode for an alkaline storage battery having a layer of the polymer.

The method of coating a zinc electrode with the polymer (I) is not specially limited. For example, there may be adopted a method wherein the polymer (I) is heat-melted and applied to the zinc electrode, a method wherein the polymer (I) is dissolved in a solvent and applied to the electrode, or a method wherein a coating solution containing at least a precursor of the polymer (A) and/or a precursor or the polymer (A') (the precursor(s) will hereinafter be referred to as "precursor (E)") is applied to the zinc electrode, followed by treatment into polymer.

According to an example of the heat-melting method for the polymer (I), the polymer (I) is melted at a temperature of usually 120° to 200° C. and then coated onto the zinc electrode by application or dip coating.

According to the method of dissolving the polymer (I) in a solvent and coating the zinc electrode with the resulting solution, there is used as the polymer (A) at least one kind of polymer selected from the group consisting of polydimethylsiloxanes, polyorganosiloxanes, polyvinyltriorganosiloxanes, polyalkylsulfones, poly(4-methylpentene-1), poly(2,6-dimethylphenylene oxide) and low-density polyethylenes. The polymer (I) is dissolved in a solvent capable of dissolving at least the polymer (I), then other components are added as necessary, then the upper surface of the zinc electrode is coated with the resulting solution by application, dip coating, spin coating or spraying, followed by drying.

As examples of such solvent there are mentioned hexane, decalin, toluene and o-dichlorobenzene.

As examples of the method of coating the zinc electrode with a coating solution containing at least the precursor (E) followed by treatment into polymer, there are mentioned a method wherein the upper surface of a zinc electrode is coated with a coating solution containing the precursor (E) by application, dip coating, spin coating or spraying, followed by heating, light radiation or gelation, and a method wherein a curing accelerating component is incorporated beforehand into a coating solution containing the precursor (E) and after coating, reaction and curing are allowed to take place automatically or using a suitable means such as heating to obtain the polymer (I).

It is here assumed that the coating solution containing the precursor (E) contains the polymer (C) and/or the polymer (D) where required.

As examples of the precursor (E) there are mentioned low-density polymers and oligomers having such groups as —SiH, —SiCl, —SiCH=CH$_2$ and —SiCH$_2$SH, as well as those polymers and oligomers with the group (B) introduced therein if necessary.

It is desirable that the coating solution containing the precursor (E) contain the polymer (C). In the case where the precursor (E) and the polymer (C) are not compatible with each other, there may be used a solvent capable of dissolving the two, or a precursor ("precursor (F)" hereinafter) of the polymer (C) may be used in place of the polymer (C), whereby there can be obtained a uniform polymer coating. Also as to the polymer (D), which may be contained in the polymer (I) if necessary, a precursor ("precursor (G)" hereinafter) of the polymer (D) may be used in place of the polymer (D).

The use of an alkoxysilane sol as the precursor (E) is also useful. For example, there may be adopted a method wherein a precursor (E) such as dimethyldiethoxysilane, tetraethoxysilane or phenyltriethoxysilane is made into sol in an aqueous solution, into which are then added, as necessary, the polymer (C) or the precursor (F), further, the polymer (D) or the precursor (G) as well as other components if necessary, to prepare a coating solution. Then a zinc electrode is coated with the coating solution, followed by drying and gelation, whereby there can be obtained a zinc electrode coated with the polymer (I).

A suitable thickness of the polymer (I) coating on the zinc electrode can be selected according to the kind of the polymer (I), oxygen permeability constant and durability of the polymer layer to be formed, interelectrode distance, separator thickness, mechanical strength of the electrode and the amount of zinc active material. In a dry condition, it is usually in the range of 0.01 to 2.00 mm, preferably 0.05 to 0.5 mm. If the thickness of the polymer coating is smaller than 0.01 mm, there usually will not be attained a satisfactory effect of suppressing dendrite, and if it is larger than 2.00 mm, there will not be obtained a satisfactory oxygen permeability or ion conductivity. Thus, both such values are undesirable.

The alkaline storage battery of the present invention is constituted by a combination of the negative zinc electrode for alkaline storage battery described above with separator, positive electrode and electrolyte.

The positive electrode used in the present invention is not specially limited if only it is formed of a positive electrode material for an alkaline storage battery used commonly. As examples there are mentioned an electrode containing nickel as a main component, an electrode containing silver as a main component, and an electrode containing manganese dioxide as a principal component.

Also as to the separator to be used in the invention, no special limitation is placed thereon if only it is a separator used in an ordinary battery. Even when a separator whose dendrite suppressing effect is not satisfactory is used in the present invention, there can be obtained an alkaline storage battery having a cycle life long enough in practical use because the negative electrode itself exhibits both dendrite suppressing action and shape change preventing action to a satisfactory extent. As examples of separators employable in the invention there are mentioned cellophane, porous glass, polyethylene non-woven fabric and polypropylene non-woven fabric. Also employable are conventional separators which exhibit a dendrite suppressing action such as a non-woven fabric treated with a surface active agent and a non-woven fabric with a metal such as nickel adhered thereto. Further, the separator can be omitted and the battery can be constituted by only negative and positive electrodes and a solution holding layer provided between both electrodes. This depends on properties of the polymer layer formed on the negative electrode. Moreover, since the polymer layer on the negative electrode does not have electronic conductivity, the battery can be constituted by only positive and negative electrodes as long as the negative zinc electrode possesses a sufficient solution holdability.

The electrolyte used in the present invention contains an aqueous alkali solution as a main component. No special limitation is placed thereon if only it is one used in an ordinary alkaline storage battery. As examples of a principal component of the electrolyte there are mentioned aqueous sodium hydroxide solution, aqueous potassium hydroxide solution and aqueous lithium hydroxide solution. Various additives used in a conventional alkaline storage battery may be incorporated in the electrolyte according to purposes. Examples of such additives include zinc oxide, lead oxide and organic surfactants.

If a polymer which is swollen by a component of the electrolyte, e.g. water, is contained in the polymer layer on the negative zinc electrode for the alkaline storage battery of the invention, then when the negative zinc electrode is immersed in the electrolyte, a thin electrolyte layer may be formed in part or the greater part between the zinc active material and the polymer layer and thus there can be obtained a storage battery having particularly superior discharge characteristics.

In the negative zinc electrode for an alkaline storage battery obtained according to the present invention, the development of dendrite and that of a shape change are diminished to a remarkable extent by the action of the polymer layer formed substantially in direct contact with the surface of the negative electrode and constituted by a polymer having an oxygen permeability constant of not less than $1 \times 10^{-10}$ cm$^3$ (STP) cm$^{-1}$s$^{-1}$cmHg$^{-1}$, so that the storage battery using such negative zinc electrode has a sufficiently long cycle life.

The following examples are given to illustrate the present invention more concretely, but the invention is not limited thereto.

EXAMPLE 1

Production of Zinc Electrode 4 ml of a 5 wt % aqueous polyvinyl alcohol solution was added to 6.0 g of zinc oxide, 3.0 g of zinc powder and 0.1 g of polytetrafluoroethylene, followed by kneading, then the kneaded mixture was applied to a portion (2 cm long by 20 cm wide) of a plate-like 20-mesh copper net (5 cm long by 20 cm wide), followed by rolling with a roller and drying, to obtain a zinc electrode having an electrode area of 40 cm$^2$. The zinc electrode was then cut into electrodes each having an electrode area of 2 cm$^2$ for use in experiment.

Coating of Zinc Electrode

Hydrochloric acid was added into 10 ml of a 10 wt % aqueous polyvinyl alcohol solution to adjust the pH value of the solution to 3. Further, 1.0 g of dimethyldiethoxysilane was added, followed by heating at 60° C. for 5 hours under stirring, to obtain a sol. Then, 0.1 g of carboxymethyl cellulose and 0.5 g of tetraethoxysilane were added, and further added was an aqueous potassium hydroxide solution to adjust the pH to 11. In this way there was prepared a coating solution.

The zinc electrode produced above was dipped in the coating solution and pulled up, then dried by heating at 80° C. for 1 hour, whereby there was obtained a zinc electrode for an alkaline storage battery having a polymer layer about 200 μm thick which was substantially in direct contact with the zinc electrode surface.

An oxygen permeability constant of a polymer film corresponding to the above polymer layer was determined by the pressure method to be $8.8 \times 10^{-8}$ cm$^3$ (STP) cm$^{-1}$s$^{-1}$cmHg$^{-1}$.

A battery cell having an internal volume of 1 cm long by 1 cm wide by 5 cm high was formed using a sintered type nickel electrode (electrode area: 2 cm$^2$) as a counter electrode and a 30 wt % aqueous potassium hydroxide solution as electrolyte and without using a separator. Then, using this battery cell, there was conducted a charge and discharge test. (Constant temperature 20° C., charging current 10 mA, charging end potential 1.92 V, discharge current 20 mA, discharge end potential 1.2 V)

The construction of the battery cell is as shown in FIG. 1, and a cycle characteristic obtained is shown as battery (a) in FIG. 3.

EXAMPLE 2

Coating of Zinc Electrode

For 10 units of polymethylhydrosiloxane —OSi(CH$_3$)H—, vinylacetic acid and 1-heptene were grafted to 5 and 3 units, respectively, using chloroplatinic acid as catalyst, to prepare a coating solution.

Just before use of the coating solution, polydimethylsiloxane having vinyl groups at both ends was added in an amount for reaction with 2 units of the above polymethylhydrosiloxane. Immediately thereafter, the zinc electrode obtained in Example 1 was dipped in the coating solution, then pulled up and thereafter heat-cured at 60° C. for 1 hour to afford a negative zinc electrode for an alkaline storage battery having a polymer layer about 100 μm thick which was substantially in contact with the zinc electrode surface.

An oxygen permeability constant of a polymer film corresponding to the above polymer layer was determined by the pressure method to $1.1 \times 10^{-7}$ cm$^3$ (STP) cm$^{-1}$s$^{-1}$cmHg$^{-1}$.

A battery cell having an internal volume of 1 cm long by 0.4 cm wide by 5 cm high was formed using a sintered type nickel electrode (electrode area: 2 cm$^2$) as a counter electrode, a 30 wt % aqueous potassium hydroxide solution as electrolyte and a polypropylene non-woven fabric as a separator. Then, using this battery cell, there was conducted a charge and discharge test. (Constant temperature 20° C., charging current 10 mA, charging end potential 1.92 V, discharge current 20 mA, discharge end potential 1.2 V)

The construction of the battery cell is as shown in FIG. 2, and a cycle characteristic obtained is shown as battery (b) in FIG. 3.

Comparative Example 1

A zinc electrode was fabricated in the same way as in Example 1 except that it was not coated with the polymer layer. Then, in the same manner as in Example 1, a battery cell was formed and a charge and discharge test was conducted. The result obtained is shown as battery (c) in FIG. 3.

In 27 cycles there occurred a short circuit due to the formation of dendrite and it became no longer possible to effect charge and discharge.

Comparative Example 2

The zinc electrode fabricated in Example 1 was dipped in a 10 wt % aqueous PVA solution, then pulled up and heat-dried at 80° C. for 1 hour to obtain a zinc electrode having a PVA layer about 30 μm thick which was substantially in direct contact with the electrode surface, followed by a charge and discharge test in the same way as in Example 2. The result obtained in shown as battery (d) in FIG. 3.

An oxygen permeability constant of a PVA film corresponding to the above PVA layer was determined by the pressure method to be about $8.5 \times 10^{-13}$ cm$^3$ (STP) cm$^{-1}$s$^{-1}$cmHg$^{-1}$.

The batteries fabricated in Examples 1 and 2 according to the present invention are alkaline storage batteries each using a negative zinc electrode having a polymer layer substantially in direct contact with the zinc electrode which uses zinc as an active material, the polymer layer comprising a polymer having an oxygen permeability constant of not less than $1 \times 10^{-10}$ cm$^3$ (STP) cm$^{-1}$s$^{-1}$cmHg$^{-1}$. The charge and discharge characteristics of these batteries, which are shown as batteries (a) and (b) in FIG. 3, are superior to the charge and discharge characteristic (c) of the battery using an electrode having no polymer layer in Comparative Example 1 and also superior to the charge and discharge characteristic (d) of the battery using an electrode having a polymer layer which comprises a polymer having an oxygen permeability constant of less than $1 \times 10^{-10}$ cm$^3$ (STP) cm$^{-1}$s$^{-1}$cmHg$^{-1}$ in Comparative Example 2.

According to the charge and discharge characteristic (c) of the battery using an electrode having no polymer layer in Comparative Example 1, there occurred in 27 cycles a short circuit due to the formation of dendrite and thereafter it became impossible to effect charge and discharge.

Also according to the charge and discharge characteristic (d) of the battery using an electrode having a polymer layer which comprises a polymer having an oxygen permeability constant of less than $1 \times 10^{-10}$ cm$^3$ (STP) cm$^{-1}$s$^{-1}$cmHg$^{-1}$ in Comparative Example 2, the dendrite suppressing effect was unsatisfactory, the polymer layer gradually become deformed with increase of the charge and discharge cycle and at least dendrite grew out of the polymer layer. There also was a short-circuited sample.

On the other hand, in the case where electrodes according to the present invention were used, a short circuit caused by dendrite did not occur, as is seen from (a) and (b) in FIG. 3. Further, if a time point at which the discharge capacity became 60% of the initial discharge capacity is defined to be a cycle life, the cycle life of each of the batteries using the electrodes obtained in the foregoing Examples was twice or more as long as that of the batteries using electrodes not having a polymer layer.

What is claimed is:

1. A negative zinc electrode for an alkaline storage battery, comprising an electrode using zinc as an active material and a polymer layer coated on said electrode, said polymer layer comprising a polymer having an oxygen permeability constant of not less than $1 \times 10^{-10}$ cm$^3$ (STP) cm$^{-1}$s$^{-1}$cmHg$^{-1}$.

2. A negative zinc electrode as set forth in claim 1, wherein the polymer layer comprises at least two kinds of polymers.

3. A negative zinc electrode as set forth in claim 1, wherein the polymer is a polymer having a molecular weight of about 1,000 to about 2,000,000 and is selected from the group consisting of polydimethylsiloxanes, polyorganosiloxanes, polyvinyltriorganosiloxanes, polyalkylsulfones, poly(4-methylpentene-1), poly(2,6-dimethylphenylene oxide) and low-density polyethylenes.

4. A negative zinc electrode as set forth in claim 1, wherein the polymer comprises at least one functional group introduced therein, the functional group is selected from the group consisting of —COOH, —CN, —CONH$_2$ and —N$^+$R$_3$ wherein R is a hydrogen atom or an alkyl group having 1 to 4 carbon atoms, and the functional group is introduced in the polymer in a proportion of 1 to 50 units for 10 monomer units of the polymer.

5. A negative zinc electrode as set forth in claim 3, wherein the polymer contains a further polymer is an amount sufficient to decrease an internal impedance, said further polymer exhibiting an ion conductivity of $10^{-3}$ to $10^1$ S/cm in a fully swollen condition in an electrolyte.

6. A negative zinc electrode as set forth in claim 5, wherein said further polymer is polyvinyl alcohol, carboxymethyl cellulose, polyacrylonitrile, polyacrylic acid, polymethacrylic acid, polyacrylate, polymethacrylate, polyvinylpyrrolidine, polyparabanic acid, polyoxazoline, or polyethylene oxide.

7. A method for making a negative zinc electrode for an alkaline storage battery, comprising the steps of forming on a zinc electrode a coating containing at least a polymer precursor which is in the state of a sol and then causing gelation of the polymer precursor sol to form a polymer layer coated on the zinc electrode, said polymer layer having an oxygen permeability constant of not less than $1 \times 10^{-10}$ cm$^3$ (STP) cm$^{-1}$s$^{-1}$cmHg$^{-1}$.

8. An alkaline storage battery comprising the negative zinc electrode described in claim 1, a separator, a positive electrode and an electrolyte.

* * * * *